Nov. 4, 1958 W. RUEFENACHT 2,859,028
CHAIN WEIGHT ADAPTER MECHANISM FOR BALANCES
Filed May 31, 1952
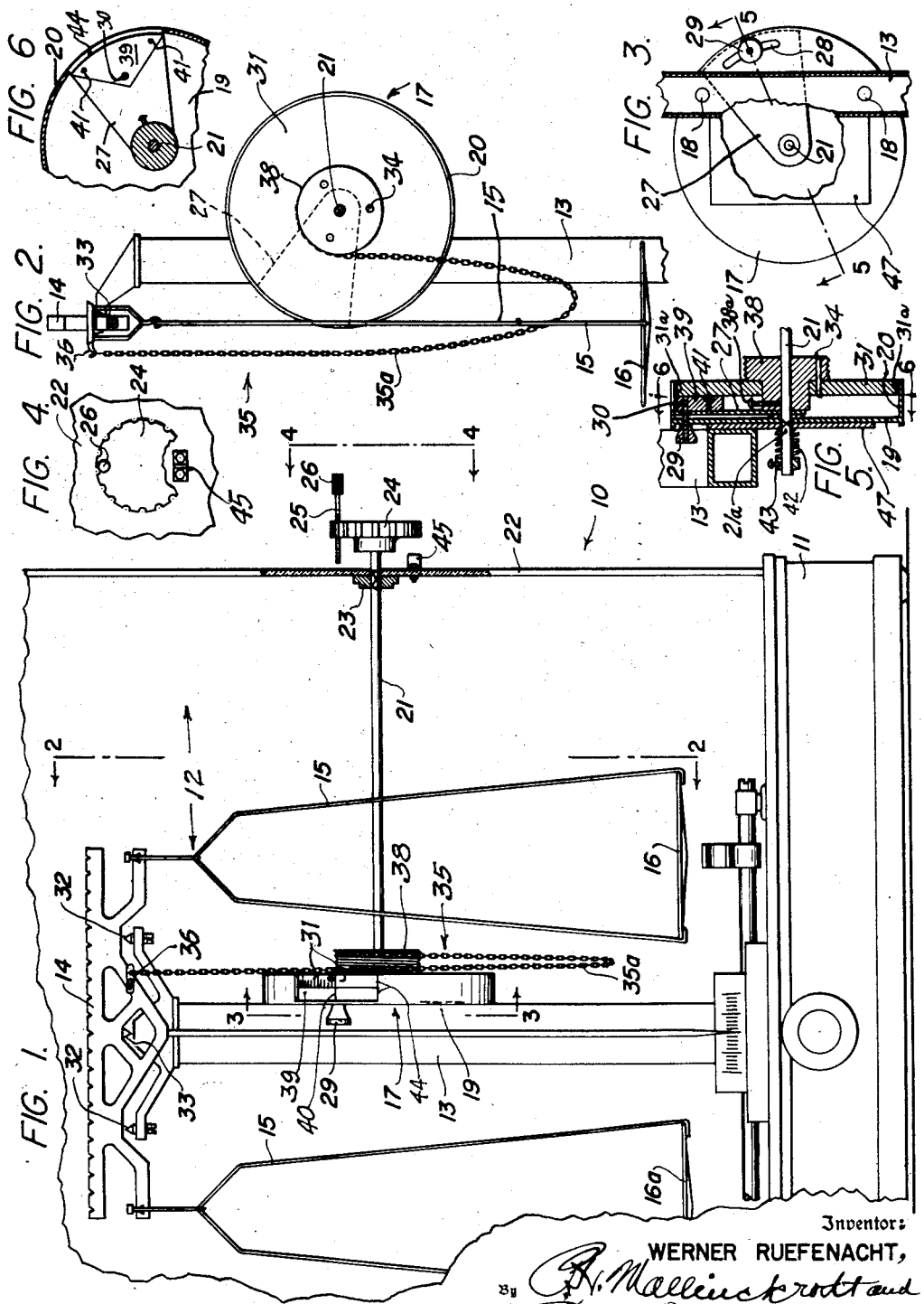
Inventor:
WERNER RUEFENACHT,
By
Attorneys.

United States Patent Office 2,859,028
Patented Nov. 4, 1958

2,859,028

CHAIN WEIGHT ADAPTER MECHANISM FOR BALANCES

Werner Ruefenacht, Salt Lake City, Utah

Application May 31, 1952, Serial No. 290,975

4 Claims. (Cl. 265—60)

This invention relates to chain weight adapters for balances and more particularly to a self-contained adapter mechanism whereby the chain weight feature is advantageously added to ordinary balances of existing designs.

Balances are used in the chemical, metallurgical and other industries where precise weighing is required. The chain weight feature promotes, among other things, rapidity and convenience in many precision weighing operations. Chain weight balances, or chain-poise balances as these are sometimes called, are ordinarily relatively expensive. There are many balances in use which do not have the chain weight feature. At the same time many of such balances are of excellent workmanship and can be equipped with the present mechanism at moderate cost.

Therefore, it is an important object of the invention to bring about an industrial economy in salvaging existing balances. An added object is to provide means whereby the desirable chain weight feature can be economically built into new balances as original equipment.

A characteristic of chain weight balances is that small increments or decrements in weights can be applied in precision weighing with simply a slight movement of the operator's hand at a point preferably located outside of the balance casing. A particularly valuable feature of chain weight balances is in equilibrating a balance in preparation for performing a weighing operation.

Heretofore, in order to secure the valuable features of the chain weight type it has been necessary to purchase an entirely new balance. Briefly, by means of the invention, existing balances which ordinarily are without the chain weight, can be equipped at minimum expense with a mechanism embodying the characteristics of the chain weight feature.

In the accompanying drawing which illustrates an excellent embodiment of the invention, Fig. 1 represents a fragmentary front elevation partially in section, of a usual precision balance which is equipped with the apparatus of the invention;

Fig. 2, a fragmentary side elevation viewed from the line 2—2 in Fig. 1;

Fig. 3, a vertical section taken on the line 3—3 in Fig. 1, showing various details, portions being broken away for convenience;

Fig. 4, a fragmentary end elevation viewed from the line 4—4 in Fig. 1;

Fig. 5, a fragmentary section taken on the line 5—5 in Fig. 3;

Fig. 6, a vertical section taken on the line 6—6 in Fig. 5.

Referring to the drawing, the numeral 10 denotes a precision balance structure having the base 11 and the superstructure 12. Secured on the base 11 is a column 13 on which is mounted a beam 14 from the opposite ends of which are suspended the pan hangers 15.

In the present example, weights are placed in one pan 16, while the object or substance to be weighed is placed in the other pan 16a. Thus, in precisely weighing a given object, it is necessary to vary the weighing weight until it and the thing to be weighed are in substantial equilibrium. This means that in precise weighing the variations are extremely small. Such small variations are advantageously made by means of a suspended chain or other suitable wrapping weight. The present example of a weight is a chain 35, which has one end thereof attached at 36 to the beam 14, and the other end thereof attached to a winding drum 38. This drum is fixed on a disk 31, as by rivets 34, Figs. 2 and 5, and is rigidly mounted, for example by means of a set screw 38a, on a rotative shaft 21. On the circumferential face of the disk 31 is a graduated weight scale 31a. Encircling the circumferential face is a flange 20 containing a transverse window 44, Figs. 1 and 6, for selectively viewing varying portions of the weight scale. The flange 20 has a fixed back portion 19 in contact with an adapter plate 47, Figs. 3 and 5, the back portion 19 and the adapter plate being transversely fixable on the column 13 by suitable means, such as bolts 18.

The adapter plate 47 serves as a positioner for the mechanism of the invention in applying the mechanism to an existing balance which lacks a chain weight mechanism as original equipment.

Centered on the shaft 21, so as to have arcuate motion along the back portion 19, Figs. 2 and 5, is an arm 27. Fast on the arm 27, in this instance by means of rivets 41, Fig. 6, is a datum marker 39, Figs. 1 and 5, on the face of which is a datum line 40, Fig. 1, visible in the window 44. Fast in the datum marker 39 is a stem 30 which at its outer end has a thumb nut 29.

During an equilibrating process, the zero point of the scale on the disk 31, and the line 40 on the datum marker 39 are brought into registry with each other, as in Fig. 1, after which the thumb nut is tightened. This locks the disk 31 and the datum marker 39 in temporary frictional contact with each other. Now, by means of the shaft 21 and the drum 38, the oscillating beam 14 and its appurtenances are manually brought into equilibrium. This means that as soon as the thumb nut 29 is turned in reverse to loosen it, the weight scale on the disk 21 is free to revolve along the datum line 40, Fig. 1.

The shaft 21 has one end thereof journaled at 21a in a bearing formed in housing capsule 17 and at its other end is carried in a bearing 23. The shaft 21 extends outside the wall 22 and is provided with a fluted operating wheel 24. This wheel carries a threaded screw 25 ending preferably in a knurled knob 26, for manual manipulation. The screw 25 is eccentrically disposed in the knob 26 and assists in turning the wheel 24, crank fashion, and at other times acts as a brake to keep the shaft 21 from turning. In order to attain the braking action, the screw 25 is screwed against the surface of the wall 22 so as to frictionally contact the same.

At 42 is a helical compression spring encircling the shaft 21 and is adjustably held by a set collar 43 to form biasing means operative to keep the indicating disk 31 in yielding contact with the datum marker 39. In other words, a friction clutch contact is formed between the indicating disk 31 and the datum marker for use during the equilibrating process. The clutch becomes effective in its clutching capacity by tightening the thumb nut 29. Declutching is accomplished by loosening the thumb nut 29. This leaves the indicating disk 31 and its drum 38 free for controlling the significant hanging portion 35a of the chain 35 when the fluted wheel 24 on the shaft 21 is rotated.

What is hereinbefore called the housing capsule comprises the fixed back portion 19 with its forwardly extending circumferential flange 20. Included in the capsule is the closure disk 31, the disk being freely rotatable in the open face of the flange 20.

It frequently is desirable to provide a definite limit of rotation for the shaft 21. For this purpose a stop 45 is engageable by the screw 25 when the latter is screwed inwardly.

Assuming that the adapter mechanism has been attached to the balance as afore-explained, the balance is equilibrated in the usual manner. Then, the knob 26 is turned in the appropriate direction to screw brake stem 25 against wall 22, care having been taken to see that the zero graduation of the weight scale 31a is in a convenient position to be viewed through the window 44.

Next, by means of the thumb nut 29, the datum marker 39 is loosened from the disk 31 and is used to bring the datum mark 40 from any random point of use into registry with the zero graduation of the weight scale 31a.

Now, by retracting the brake stem 25, the balance is ready for use. By manually turning the wheel 24 forward or back as required, any number of precise weighing determinations may be accomplished.

What is claimed is:

1. A chain weighing adapter mechanism for balances having a column, an oscillating beam, and a chain weight having one end on the beam, said mechanism comprising a rotative shaft extending transversely of the column; a housing capsule having a back portion, means securing said back portion to said column, a circumferential flange extending forwardly of the back portion to provide an open face portion, and an indicating disk mounted on said shaft for rotation within the said open face portion and serving as a closure therefor; and a winding drum fixed on the indicating disk for controlling the other end of the chain weight.

2. The mechanism of claim 1, wherein the shaft is journaled at the back portion of the housing capsule; a journal bearing for the shaft is disposed axially remote from said back portion and outside said capsule; and a brake mechanism for the shaft is disposed in axial proximity to the said journal bearing.

3. The mechanism of claim 2, wherein the brake mechanism includes a knob fixed on the shaft; and a brake pin eccentrically disposed in the knob.

4. The mechanism of claim 1, wherein the indicating disk has a circumferential face bearing a graduated weight scale; there is provided an arm centered in the shaft axis and having an arcuate face on which is a datum mark; and there are provided means operative to bring the datum mark into registry with a point on the weight scale.

References Cited in the file of this patent

UNITED STATES PATENTS

| | | |
|---|---|---|
| 1,258,009 | Jacobs | Mar. 5, 1918 |
| 1,867,008 | Heusser | July 12, 1932 |
| 1,964,349 | Gattoni | June 26, 1934 |
| 2,004,745 | Becker | June 11, 1935 |
| 2,127,995 | Grainger | Aug. 23, 1938 |
| 2,230,491 | Heusser | Feb. 4, 1941 |
| 2,598,532 | Gibbon | May 27, 1952 |

FOREIGN PATENTS

| | | |
|---|---|---|
| 448,524 | Great Britain | June 10, 1936 |